Nov. 21, 1944.  S. H. A. YOUNG  2,363,107
EXPANDIBLE PLASTIC MOLD
Filed July 19, 1941  4 Sheets-Sheet 2

INVENTOR.
Serenus H. A. Young
BY Parkinson & Lane
Attys

Witness:
Chas. R. Kourch

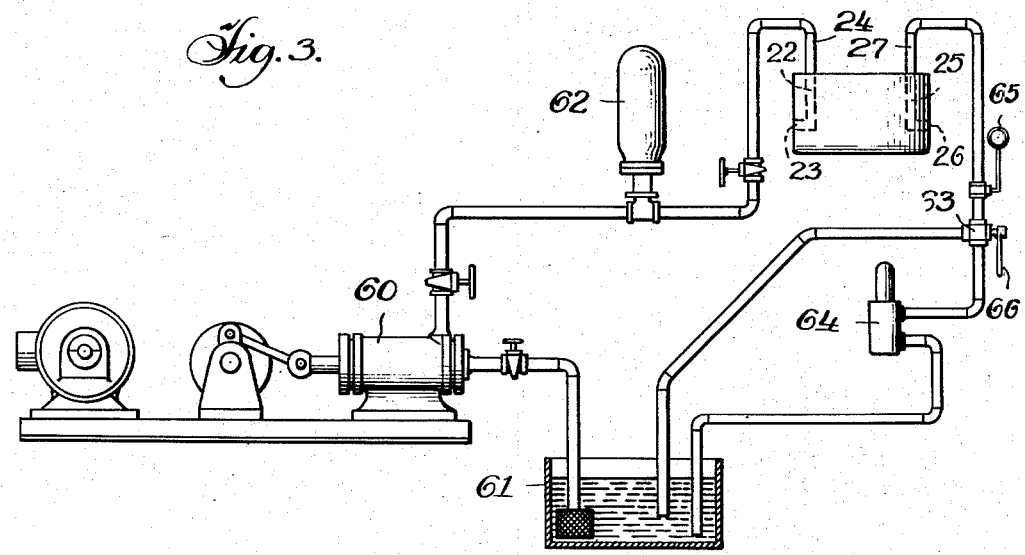
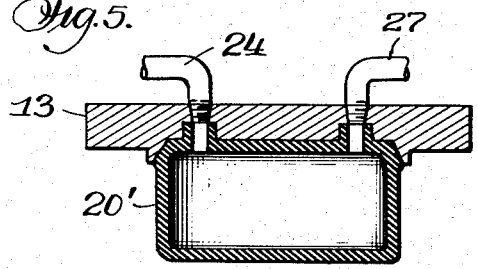
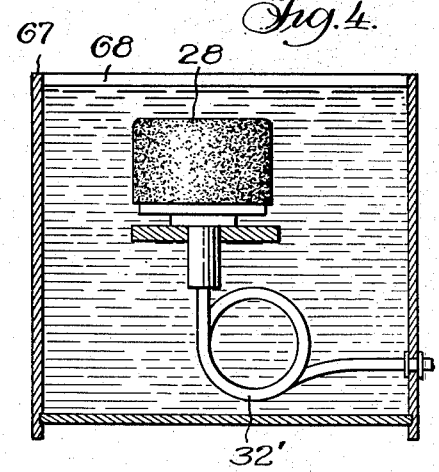
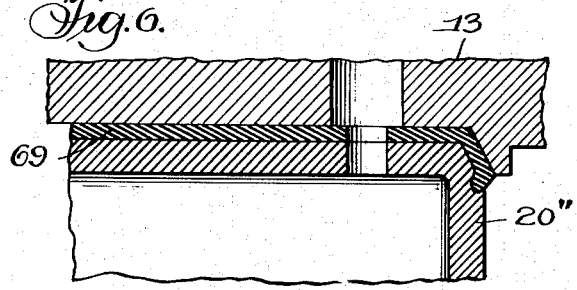

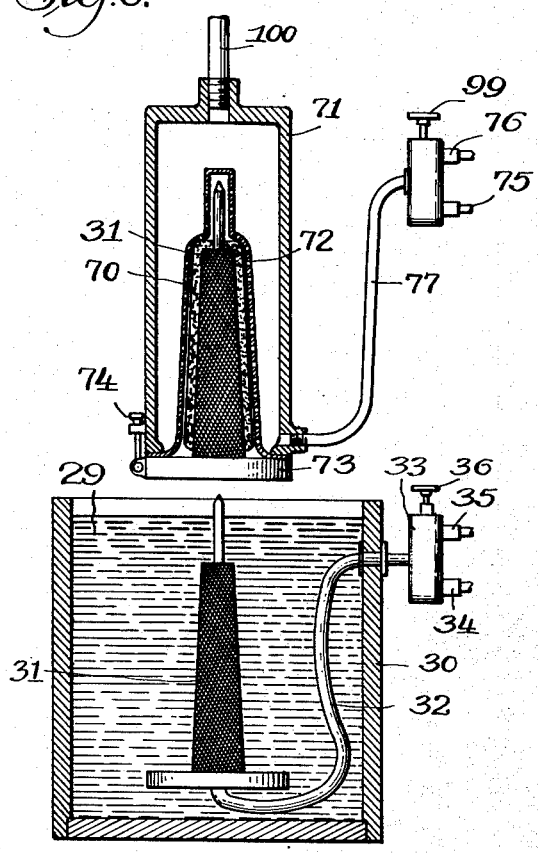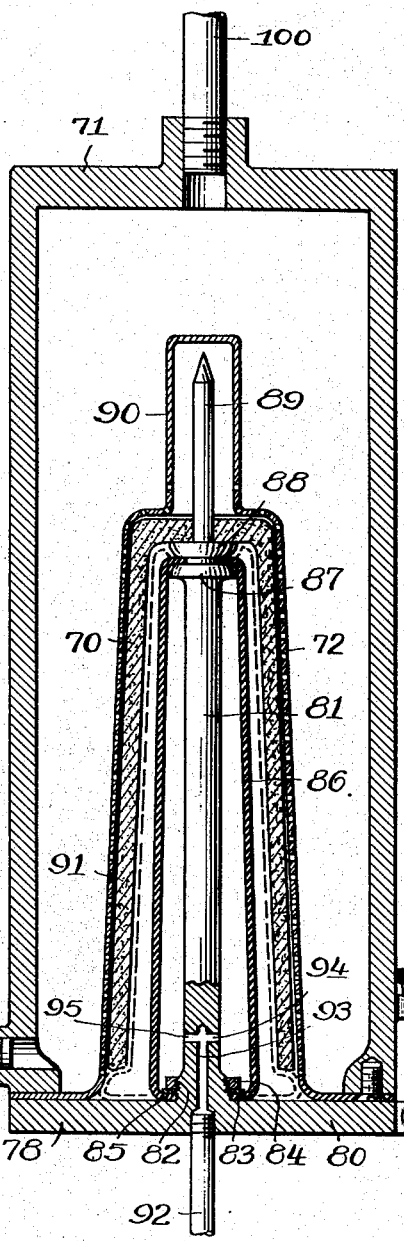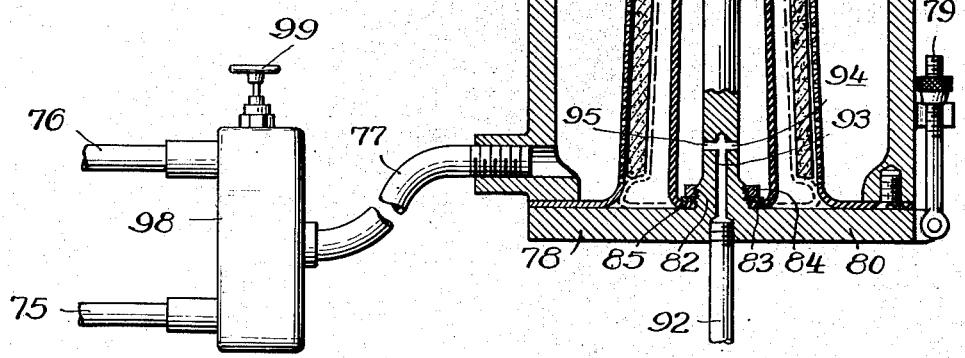

Patented Nov. 21, 1944

2,363,107

UNITED STATES PATENT OFFICE 2,363,107

EXPANDIBLE PLASTIC MOLD

Serenus H. A. Young, Oak Park, Ill., assignor to Jesse B. Hawley, Geneva, Ill.

Application July 19, 1941, Serial No. 403,101

2 Claims. (Cl. 18—17)

This invention relates to a mold for molding plastic materials, and more particularly to such mold having an expendible element for exerting the pressure on the article being molded in which mold the heretofore necessary extremely large capacity, size and power for the press is obviated.

The particular phase of the plastic molding art to which this invention relates is that of compression molding, in which the use of thermosetting plastic materials predominates as distinguished from that phase of the molding art known as injection molding, wherein thermoplastic materials are principally used. This invention further relates particularly to the art of molding accreted fibrous contoured plastic articles, which differs, among other ways, from the conventional phenolic and urea compounds in that in the present invention the articles are initially accreted or preformed to substantially the same shape and contour as will be possessed by the finished molded article. In the old methods heretofore known, conventional thermosetting phenolic and urea compounds are used principally in the form of granules, which when placed in the mold and subjected to heat and pressure flow to the extent necessary to fill the space between the male and female portions of the mold. In the present invention, the accreted, contoured plastic materials referred to are in substantially their final position and hence a minimum of flow is required.

Heretofore, it has been conventional practice when molding thermosetting plastic materials, to place a measured quantity of the powder or granules into the mold cavity and, when subjected to heat and pressure, these materials flow through considerable distances in following and filling the contour defined by the mold. While some articles have been satisfactorily molded by such old method, limitations imposed by equipment and flow properties of conventional plastic materials has precluded the possibility of molding very large parts.

It is an object of the present invention to provide an apparatus by which articles of comparatively large size and intricate contour can be satisfactorily molded, and to avoid the limitations to which conventional plastic materials and methods are subjected.

Further, the molding of conventional plastic materials of the type specifically known as high impact materials, has been severely limited as to size and contour because, although conventional plastic materials are dependent on their ability to flow to fill the mold space, the high impact material is characterized by a low flowability. It is accordingly another object of the present invention to provide an apparatus for molding accreted contoured plastic articles which possess high impact qualities without encountering the difficulties normal to the molding of conventional high impact materials.

In the operation of the molding apparatus of the present invention, the physical loads or stress involved in the molding operation are utilized and distributed in a manner quite different from that used in conventional molding practice. For example, in the conventional method, all the pressures exerted on the mold cavities proper and on the molding material in the cavity are equalized to the pressure developed in the hydraulic cylinder exerting the pressure on the mold. In the present invention the main hydraulic cylinder (which is directly comparable to a similar cylinder used in a conventional molding press) is used merely to raise and lower the upper portion of the die and its supporting structure. When the press and the mold are locked together in closed position and fluid pressure exerted behind the flexible member, an upward force equal to the unit pressure back of the flexible member multiplied by the projected area of the mold cavity is developed and must be resisted to prevent opening of the mold. In the conventional mold and press system, this upward force would resolve itself into tension loads to be carried by the posts or columns. This, of course, requires very heavy construction of presses where pieces of large size are to be molded.

In the present invention none of the physical loads of molding is taken by the structure of the press itself, but are carried by an especially strong arrangement of parts provided for holding the male and female parts of the mold together. The load involved in the molding process is confined first to the mold, and second to the parts holding the molding die parts together, with none of the heavy loads being taken by the press structure itself. This means that the excessively high cost of heavy molding press equipment is entirely eliminated, and further that the size of the article to be molded is limited only by the size of the mold obtainable, which are further objects of this invention.

In conventional molding of plastic materials, hydraulic presses are principally used. Normal pressure of 2,000 to 4,000 lbs. per square inch on the projected area of the article to be molded are current practice. If, for example, an article to be molded has an area of 2,000 square inches, a hydraulic press having a capacity of 2,000 to 3,000 tons would be required to produce a satisfactory molding by conventional methods. In the present invention, however, in molding an article of similar size, a hydraulic press with a capacity not exceeding 25 tons would be employed, notwithstanding the fact that a pressure on the projected area of the article to be molded would be of the order of 2,000 to 3,000 lbs. per square inch. A further important object and advantage of this invention resides in the low cost not only of the mold used but also in the low cost of the molding press itself.

With reference to the mold itself, the present invention provides numerous advantages over conventional molding methods. It is very often the case in conventional molding practice for excessively high loads to be applied within the molding cavity in the first part of the molding cycle, during which time the materials are being plasticized and during which time the plastic materials possess little flowability. Such excessive high loads being eliminated in the present invention, very greatly lessen the cost of the molding die. Further, it often happens in conventional molding practice that inasmuch as conventional plastic molding material will not act as a true fluid when plasticized in the mold, varying pressure values will be obtained on different areas of the article being molded. In the present invention, where flowability of the plastic is not a factor because the accreted contoured plastic preform is substantially in final shape and position before pressing actually takes place, the expandible member of the mold exerting a uniform pressure over the entire area of the preform, such preform possesses very uniform characteristics when the molding process has been completed.

The present invention further contemplates where necessary the inclusion of accreted inserts to be placed anywhere desired on the surface of the main preform to permit the molding of the accreted contoured plastic articles having non-uniform sections. Such inserts, however, are not limited to those made of accreted material but may also include metallic inserts threaded, knurled or otherwise treated before insertion in the molded article.

A further object of the present invention is the provision of apparatus and means for felting, transferring and extracting water from resin-fiber plastic performs, as will later be more fully described.

A further object of the present invention is the provision of a novel apparatus for molding accreted fiber-reinforced plastic articles under heat and high pressure, in which is provided a mold having a pair of dies with a cavity of the desired shape therebetween, a resilient member covering one face of the cavity wall, means for clamping the two dies firmly together in such manner as to resist great pressure between the dies and applying great pressure behind the back face of the resilient member so as to exert a large uniform pressure against the accreted fibrous plastic article being molded without the necessity of a large and heavy press.

Other objects, advantages and capabilities will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings—

Fig. 3 is a diagrammatic view showing one form of hydraulic system to be used for the expansion of the expandible part of the mold.

Fig. 4 is a vertical transverse section through a tank containing a fiber-water bath and showing a fibrous preform accreted onto a porous former.

Fig. 5 is a vertical transverse section showing a modified form of the expandible member and its supporting connections.

Fig. 6 is a fragmentary vertical transverse section through a portion of the expandible member and its supporting means showing a further modified form.

Fig. 7 is a vertical transverse section of a felting tank showing a porous former immersed in a fiber-water bath in position ready to have the fibers accreted thereon.

Fig. 8 is a vertical transverse section of a transferring device and showing the accreted preform on the porous former in position therein just prior to removing the former and transferring the carcass to the water pressing device.

Fig. 9 is a vertical transverse section of the transfer device after the accreted perform has had the porous former removed therefrom, and the preform transferred to and applied over the water extractor assembly.

Figure 1:
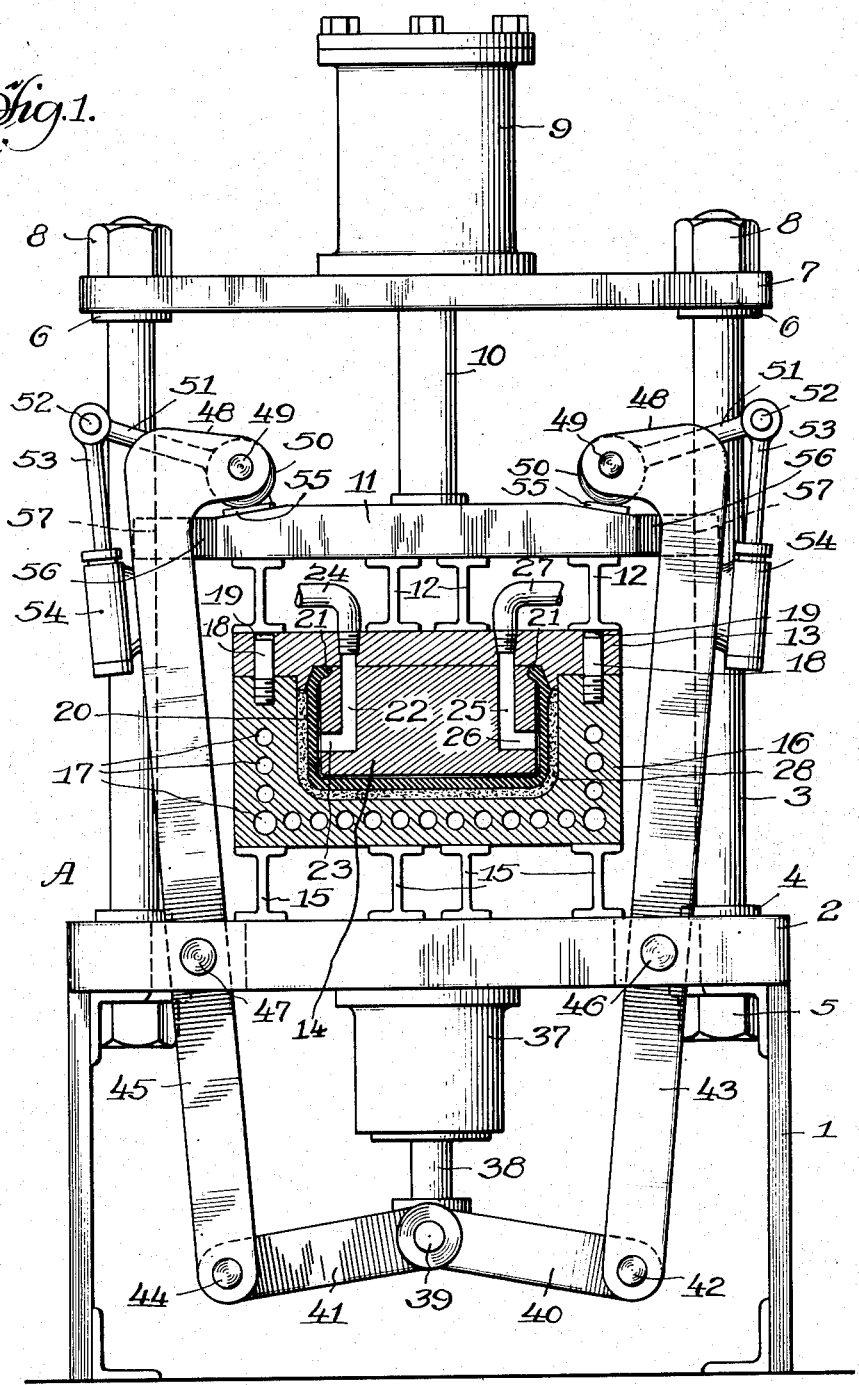
Fig. 1 is a side elevation of a molding apparatus embodying the present invention, with the male and female dies of the mold shown in vertical transverse section through a median plane, and with the mold shown in closed and clamped position.

Referring more in detail to the drawings, I have shown in Fig. 1 an apparatus for carrying out my invention and comprising a frame A having supporting legs 1 having mounted thereon a stationary support or bottom platen 2, in which is mounted the upstanding posts 3 preferably having integral collars 4 near their lower ends, which in conjunction with the nuts 5 hold posts 3 in fixed position with relation to the stationary support 2. Adjacent the upper end of each of posts 3 is an integral collar 6 forming a support for the upper stationary plate or cross support 7, which is secured in stationary position on posts 3 by nuts 8.

Mounted upon the upper plate 7 is a hydraulic cylinder 9 having the usual hydraulic piston therein, and the piston rod 10 which projects downwardly from cylinder 9, and mounted on the lower end of which for vertical movement with piston rod 10 is the head or top platen 11. The top platen or head 11 is thus seen to have vertical movement with the plunger 10 under influence of the piston head in the hydraulic cylinder 9 when fluid is introduced into the hydraulic cylinder. Secured to the lower face of the top platen 11 are cross bars 12 to which are secured the top plate 13 of the male die, there being fixed in any suitable manner to the bottom face of plate 13 the depending portion 14 of the male die. It is thus seen that the male die will have upward and downward movement with the plunger 10 when desired.

Secured to the bottom platen 2 are the cross bars 15 upon which are mounted in any desired manner the female die 16 provided with a series of openings 17 which intercommunicate to permit the entry of steam or other heating medium as desired for heating the female die 16. Screwed into the upper portion of the female die 16 are pins 18 which slidably enter openings 19 in the plate 13 of the male die to bring these two dies when closed into proper registry. Positioned over the depending portion 14 of the male die is the resilient expandable member 20 which is preferably of rubber or other suitable resilient material, and which merely rests against the outer face of the depending portion 14 of the male die except at the upper edge 21, which edge extends inwardly into a complemental groove and is clamped therein between the depending portion 14 and the plate 13 to hold the expandible member 20 unattached over the outer face of the depending portion of the male die except where it is attached at the upper edge 21 as described above. Extending downwardly at one side of the depending portion of the male mold is a passageway 22 leading at the bottom into the laterally extending passageway 23, which latter passageway opens behind the expandible member 20.

Screwed or otherwise fixed to the upper portion of plate 13 and in alignment with passageway 22, is a pipe or other suitable conduit 24 leading to any suitable source of supply of water or other fluid under pressure, so that when said fluid is introduced through pipe 24 and through passageways 22 and 23, the expandible member 20 will be distended or expanded by reason of the pressure of such fluid. I preferably use water as the fluid referred to, but wish it understood that any other suitable fluid may be used as desired. Formed in the opposite side of the depending portion of the male die is a downwardly extending passageway 25, the lower end of which connects with the laterally extending passageway 26 leading to the rear or inner face of the expandible bag 20, so that the water or other fluid used for expanding said expandible member may find its way out through passageways 26, 25 and outlet pipe 27.

Figure 2:
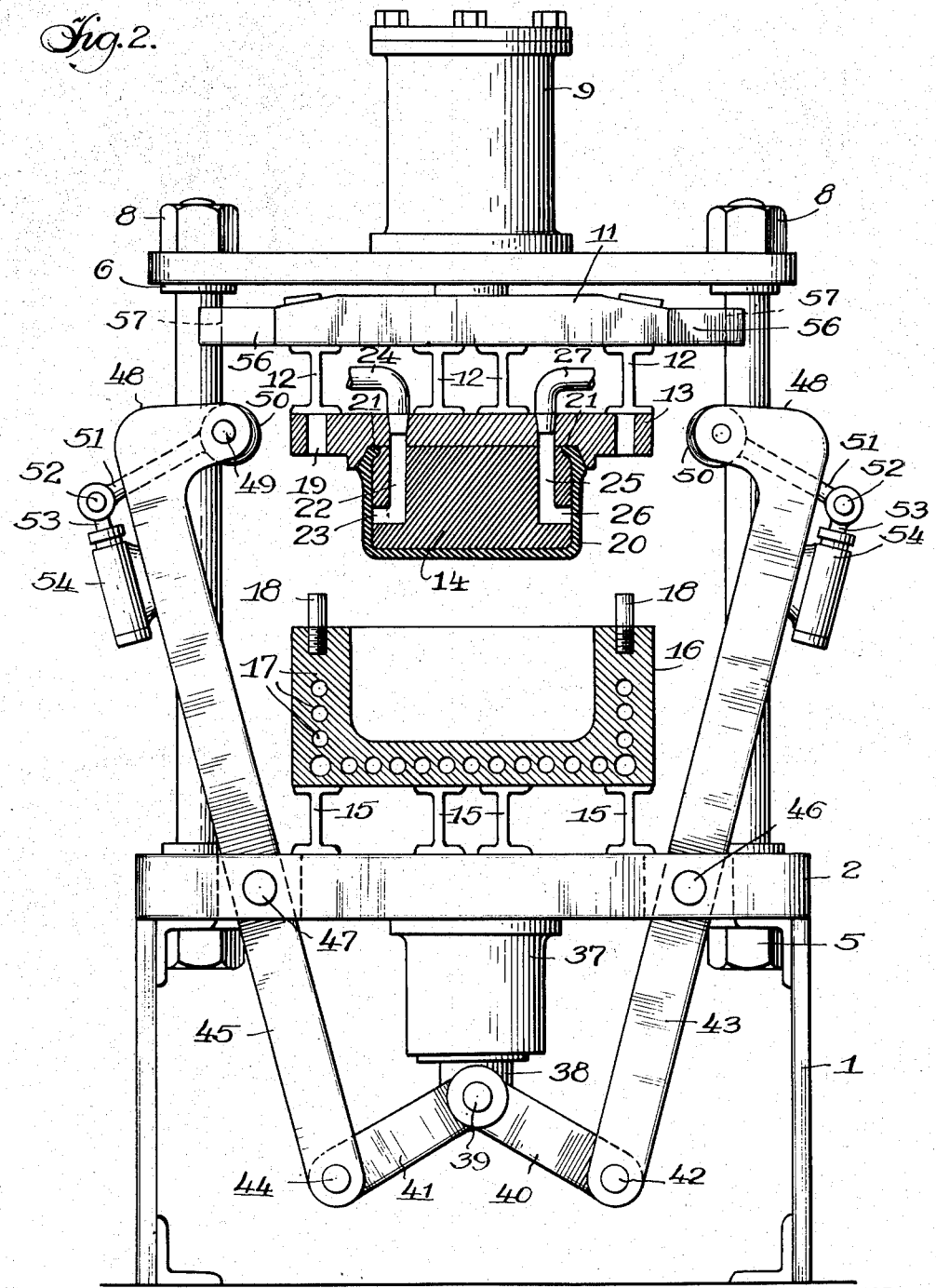
Fig. 2 is a view similar to Fig. 1 but showing the male and female dies in open position, and with the clamping means in open position.

When the male and female dies are in open position as shown in Fig. 2, the accreted fibrous pulp carcass or preform 28 will be placed either within the cavity of the female die or placed over the expandible member 20 of the male die, so that when the dies are closed said preform will substantially fill the cavity between the two dies and under influence of heat from the heating passageways 17 and pressure of water or other fluid introduced through pipe 24 be molded to form a plastic article by reason of the resin carried by the fibers of the preform becoming plastic and filling the interstices between and around said fibers to thoroughly embed the fibers in the plastic material.

Any shape of preform and finished article may be used as desired, one form being shown in Figs. 1 and 2, another form being shown in Figs. 7 to 9, and, as will be understood, many different forms may be adopted as desired, the number of forms and shapes being only limited by those of the articles to be made.

The preforms are initially made by accreting in a fiber-water bath 68 in a tank 67 (see Fig. 4) upon a porous former, suction being applied to the interior of the porous former through a hose or other flexible conduit 32', from any suitable vacuum line. When desired, the direction of flow of the air with relation to the former may be reversed.

There is added to the bath 68 a suitable resin, preferably a water soluble resin, which resin when the fibers are accreted onto the porous felting former will be deposited on and in the fibers of the carcass being thus accreted. In other words, the fibers will have coated thereon and to a certain extent impregnated therein resin whereby after the carcass or preform has been dried and placed in the mold of Fig. 1 under heat from the heating medium in openings 17 and high pressure effected by water or other fluid through pipe 24 and passageways 22, 23 to the rear or inner face of the expandible member 20, the resin will become plastic and flow into the interstices between the fibers of the preform and completely embed the fibers in the resin to form a dense, fiber-reinforced plastic article in which the fiber reinforcement is made from a preform of accreted resin carrying fibers of the same shape and the same size except for the decrease in thickness during molding as the article is being molded. The plastic material does not flow any substantial distance longitudinally in the mold but generally in a direction of the thickness of the mold. It is thus seen that the resin and fibers are in substantially their final position except for the application of heat and pressure to bring them together and render the resin plastic.

Some of the resins that may be added to the bath or, if desired, applied by spraying, dipping, painting or the like, are synthetic resins, thermosetting resins such as phenol-formaldehyde, phenol-furfural and urea formaldehyde, thermoplastic resins and natural resins such as lignin, vinsol and the like. The foregoing are merely given as examples of some of the resins that may be used, and are not intended to be exclusive as other suitable resins may be used as desired.

It is important to note that the pressure applied to the preform during the molding operation is not applied by the hydraulic cylinder 9, as the latter is merely for raising and lowering the upper die and holding the dies in closed position preparatory to application of the clamping means for clamping the two parts of the mold together, which clamping means will now be described.

Mounted upon the lower face of the bottom platen 2 is a hydraulic cylinder 37 having the usual piston (not shown) and plunger 38, this plunger being pivotally attached at 39 to the toggle links 40 and 41, link 40 being pivoted at 42 to the lever 43 and link 41 being pivoted at 44 to the lever 45. Lever 43 is pivotally mounted to the heavy pin 46, while lever 45 is pivotally mounted to the heavy pin 47.

As each of the levers 43 and 45 is of the same construction at the upper end, only one of them will be described, it being understood that the other is of a similar construction but reversed in position so that these ends move toward and away from each other. The upper end of each of these levers 43 and 45 is formed with the inturned arm 48, to which is pivotally mounted at 49 the cam 50, to which cam is fixed an arm 51 pivoted at 52 to the plunger 53 longitudinally movable in the hydraulic cylinder 54, so that when said cylinder is operated to move plunger 53 the cam 50 will be rotated to either tighten or loosen the cam against the hardened metal plate 55 carried one at each end as shown in Fig. 1 of the top platen 11. It will be understood that sufficient play will be permitted between the parts to permit articulation of plunger 53 and arm 51 without binding of the parts.

When the parts are in the position shown in Fig. 2, the plunger 38 of hydraulic cylinder 37 will be moved to its maximum limit upwardly to move the upper inturned ends 48 of levers 43 and 45 outwardly away from the top platen 11 to clear the same, there being formed in the end edges of the top platen 11, grooves or recesses 56 to permit top platen 11 to move upwardly and downwardly past the cams 50 when the upper ends of the levers 43 and 45 stand in their open or outermost position. As will also be understood, each of the corner portions of top platen 11 will be grooved to have sliding engagement with posts 3 as indicated at 57 in Figs. 1 and 2. After the upper platen 11 is moved downwardly to bring the depending portion of the male die into the cavity of the female die 16, the hydraulic cylinder 37 will be operated to move the plunger 38 downwardly into the position shown in Fig. 1, which will move the upper inturned ends 48 of the levers 43 and 45 inwardly to bring the two cams 50 directly over the hardened plates 55 as shown in Fig. 1. Application of power to each of the hydraulic cylinders 54 will cause the plungers 53 to move upwardly and move the arms 51 and turn the cams 50 into clamping engagement with plates 55 to tightly clamp and hold the upper and lower dies together. The parts, especially the pins 46, 47 and levers 43 and 45, will be of sturdy construction as they take the strain of the molding pressure applied to the inside of the mold cavity.

It is thus seen that I have provided a mold for molding plastic materials in which large pressures may be used without the necessity of providing a large and heavy press, as when the two parts of the mold are fastened together the molding pressure will be applied internally of the dies instead of externally through heavy and cumbersome mechanical presses, these internal pressures being absorbed by the clamping means described above. When the two dies of the mold are locked together as described above, with a fibrous accreted resin impregnated preform in position in the cavity of the mold, water or other fluid is introduced through the pipe 24 back of the expandible member so as to force said expandible member in all portions of its circumference and other parts with a uniform pressure against the preform. The female die as described above being heated and the preform compressed with a pressure of any desired magnitude, the resin in the preform will become plastic and will be compressed around the fibers to fill the interstices therebetween and completely embed the fibers within the plastic article thus formed. After building up suitable pressure behind the expandible member 20, the fluid passes through the outlet pipe 27 and through a pressure release valve shown in Fig. 3 in the hydraulic system, which will now be described.

In Fig. 3 is shown a hydraulic system which can be satisfactorily used for expanding the expandible member 20, and comprises the pump 60 operated by any suitable source of power, which pump draws water or other fluid from the tank 61 and delivers it under pressure to the mold inlet conduit 24, a surge tank 62 being incorporated in the pressure line if desired. Upon expansion of the expandible rubber or other resilient member 20, the fluid continues its passage through outlet pipe 27 and through the operating valve 63 to the relief valve 64 preset to any desired pressure below that to which the fluid is subjected in the pump 60. Upon passing the relief valve 64, the fluid returns to the supply tank 61. The relief valve 64 is set at a pressure below that to which the fluid is subjected in the pump 60 in order that a continuous flow of the fluid may be provided through the mold while maintaining the fluid under the desired pressure, thus permitting the fluid to be kept at the proper pressure and at the same time allowed to have a clear passage through the expandible portion of the mold back to the supply tank, and which system will prevent the fluid from exceeding the temperature of its boiling point.

A pressure gauge 65 is provided in the return line 27. When desired, the handle 66 of the operating valve 63 may be operated to divert the flow of fluid from the relief valve 64 and pass it directly to the supply tank 61, thus affording the use of any pressure desired below that at which the relief valve 64 is set. This renders more flexible the range of pressures that may be used in the molding operation.

Fig. 7 shows a tank 30 for containing a fiber-water bath 29 in which is immersed a porous felting former 31 for accreting a preform thereon of the shape shown in Figs. 8 and 9, a flexible hose 32 similar to the hose 32' in Fig. 4 being used to permit the porous former to be moved into and out of the bath. In general, the accreting operation carried out in the apparatus shown in Figs. 4 and 7 is the same, the only difference being in the particular shape of the carcass or preform being accreted. In Fig. 7 the air will be controlled by a valve 36 operating in a header 33 to connect the hose 32 with either the air line 35 or the vacuum line 34 as desired.

Fig. 5 is a modification showing an expandible member 20', which may constitute the depending portion of the male die and being completely closed except for the inlet connection for the pipe 24 and the outlet pipe 27. In this form the expandible member will itself constitute the depending portion of the male die, and will be expanded by the application of fluid pressure on its interior.

Fig. 6 shows a similar construction of expandible member except that the rubber of the expandible member 20" is calendered to fabric 69 in order to control the region of expandibility and enable connection with the top plate 13.

In Figs. 8 and 9, I have shown a transfer and pressing apparatus in which no exterior press is needed, but the pressing is like in Figs. 1 and 2 carried out inside of the apparatus.

After the carcass has been formed on the porous former 31 of Fig. 7, the former together with the carcass 70 is moved upwardly out of the bath and into the transfer housing 71, which has fixed to its bottom edge and positioned on the interior of the housing a perforated metal preform shroud 72 within which the preform carcass 70 is positioned, after which the base 73 of the felting form is clamped to the bottom of the transfer housing 71 by any suitable clamping means 74 of which any number may be used around the circumference of the housing. When the felting form with its preform carcass is within the transfer housing, the vacuum on line 34 is cut off and air through line 35 is turned on to exert the pressure inside the preform carcass to cause it to expand outwardly against the inner wall of the perforated shroud 72. At the same time suction is introduced through the line 75 and the air pressure through line 76 is cut off, thus through conduit 77 setting up a suction on the interior of the transfer housing 71 to draw the preform carcass against the interior of the shroud 72 to assist the preform carcass to adhere to the inside of the shroud. During this operation a small portion of the water in the preform carcass is extracted and drawn through the conduit 77 and vacuum line 75. The air line 35 is then cut off and the vacuum line 34 opened, and the porous felting form returned to the bath 29 in tank 30 to have another preform carcass accreted thereon to start another cycle. The transfer housing 71 is then moved together with its preform carcass to a place over an extractor assembly 78, and either lowered thereover or the latter moved upwardly into the carcass preform and the clamps 79 (of which any number desired may be used) are tightened to clamp the parts together.

The extractor assembly comprises a base 80 having the upstanding stem 81 which is formed at its bottom with the enlarged threaded portion 82 having a washer 83 and a nut 84, between which washer and base by means of the nut, is clamped the bottom flange 85 of the upstanding expandible member 86 formed of rubber or other suitable resilient material. The stem 81 is formed at its upper end with a pair of spaced collars 87, 88, between which is tightly held the upper end of the expandible member, which between these washers is formed with an opening to surround that portion of the stem between said collars. Extending upwardly from the top of stem 81 is a projection 89 which passes through an opening in the preform carcass 70 and into the upstanding portion 90 of the shroud, which at this portion is of smaller diameter than elsewhere. Shroud 72 is formed with a large number of holes 91 through which the excess water from the carcass is pressed when the expandible member 86 is expanded by fluid pressure exerted through pipe 92 and passageways 93, 94 and 95 into the interior of the expandible member. Water is preferably used but any other suitable fluid may be used as desired.

When this fluid pressure is applied to the interior of the expandible member, the latter will assume the position shown by the dotted lines in Fig. 9 and continued pressure therewithin will press the wet preform carcass against the shroud 72 and force a certain amount of water through said openings 91. This water will collect in the bottom portion of the transfer housing 71 and be carried away by a vacuum exerted through conduit 77 described above. When sufficient water has been pressed from the carcass 70, the vacuum will be cut off and through manipulation of the valve 99, air pressure from pipe 76 will be exerted through conduit 77 to loosen the carcass 70 from the shroud 72 after the fluid pressure has been released on the interior of the expandible member 86, and the clamping means 79 loosened and the extractor assembly removed from the preform carcass. The carcass 70 may then be removed from the shroud 72 for further processing, such as drying and molding. The transfer housing may then be returned to the tank 30 to receive another preform carcass and for the carrying out of another cycle. The air line 76 and vacuum line 75 are controlled by a valve 99 through the head 98, so as to connect one or the other of these pipe lines as desired to the conduit 77.

While in Figs. 7 to 9 a conical preform has been shown, it will be understood that this apparatus and method is equally applicable to preforms of the shape shown in Figs. 1 and 2 or other shapes as desired. Fastened in the top of the transfer housing 71 is a rod 100 for actuating the transfer housing in vertical or other planes as desired.

Having now described my invention, I claim:

1. In apparatus for molding fibrous plastic articles, a frame having a bottom platen, a die on said bottom platen, means for heating said die, a second die complemental to the first mentioned die, said dies when seated together having a cavity therebetween of the shape and size of the article to be molded, a top platen on which said second die is mounted, a power cylinder on the frame and having a plunger to which the top platen is secured for vertical movement with the plunger, a pair of levers pivotally mounted on the frame, each of said levers having an inturned upper end, a cam on each of said inturned ends, power means for rotating said cams with relation to said ends for clamping them against said top platen, and for clamping the dies between said top and bottom platens, a power cylinder secured to the bottom platen, a plunger movable into and out of said last mentioned power cylinder, a pair of toggle links connected from the last mentioned plunger to said levers whereby movement of the last mentioned plunger will move the cams inwardly or outwardly of the top platen, an expandible member in said cavity, and means for directing fluid pressure against one side of the expandible member to mold an article in the cavity to form a molded plastic article.

2. In apparatus for molding under high pressure, fibrous plastic articles, a frame having a stationary support, a die on the stationary support, means for heating the die, a second die complemental to the first mentioned die, said dies when seated together having a cavity therebetween of the shape of the article to be molded, a power cylinder on the frame having a plunger connected to the second die for imparting movement thereto, a pair of levers pivotally mounted on the frame, a rotatable cam on one end of each of the levers, power means for rotating said cams for clamping the two dies together, a power cylinder on the stationary support, a plunger movable into and out of the last mentioned power cylinder, a pair of toggle links connected from the last mentioned plunger to said levers for swinging the levers, an expandible member in the cavity, and means for directing fluid under high pressure against one side of the expandible member.

SERENUS H. A. YOUNG.